United States Patent [19]
Yang et al.

[11] Patent Number: 6,033,461
[45] Date of Patent: Mar. 7, 2000

[54] SELECTIVE NITROGEN OXIDES ADSORPTION FROM HOT GAS MIXTURES AND THERMAL RELEASE BY ADSORBENT

[75] Inventors: Ralph T. Yang, Ann Arbor, Mich.; Kevin Krist, Palatine, Ill.

[73] Assignee: Gas Research Institute, Chicago, Ill.

[21] Appl. No.: 09/002,480

[22] Filed: Jan. 2, 1998

[51] Int. Cl.[7] .................................................... B01D 53/04
[52] U.S. Cl. ........................... 95/129; 95/900; 423/213.2; 423/239.1; 502/405; 502/407
[58] Field of Search ............................. 95/128, 129, 900; 423/212 R, 212 C, 213.2, 239.1; 502/400, 405, 407

[56] References Cited

U.S. PATENT DOCUMENTS

| | | | |
|---|---|---|---|
| 5,041,272 | 8/1991 | Tamura et al. | 423/212 X |
| 5,108,716 | 4/1992 | Nishizawa | 422/171 |
| 5,149,511 | 9/1992 | Montreuil et al. | 423/212 |
| 5,158,582 | 10/1992 | Onitsuka et al. | 95/129 |
| 5,254,322 | 10/1993 | Bhore et al. | 423/212 X |
| 5,279,997 | 1/1994 | Montreuil et al. | 423/213.2 X |
| 5,322,671 | 6/1994 | Shustorovich et al. | 422/176 |
| 5,386,690 | 2/1995 | Shustorovich et al. | 60/274 |
| 5,388,406 | 2/1995 | Takeshima et al. | 60/297 |
| 5,399,324 | 3/1995 | Subramanian et al. | 423/213.7 |
| 5,512,251 | 4/1996 | Brunson et al. | 422/174 |
| 5,556,604 | 9/1996 | Zahn et al. | 423/213.7 |
| 5,593,647 | 1/1997 | Kirby | 422/180 |

FOREIGN PATENT DOCUMENTS

| | | | |
|---|---|---|---|
| 52-056088 | 5/1977 | Japan | 95/129 |
| 54-004890 | 1/1979 | Japan | 95/129 |
| 63-242324 | 10/1988 | Japan | 95/129 |

OTHER PUBLICATIONS

Li, W.B.; Sirilumpen, M.; Yang, R.T., Applied Catalysis B:; Selective catalytic reduction of nitric oxide by ethylene in the presence of oxygen over $Cu^{2+}$ ion–exchanged pillared clays, 1997, 11, 347.

Yang, R.T.; Li, W.B., Journal of Catalysis, Ion–Exchanged Pillared Clays: A New Class of Catalysts for Selective Catalytic Reduction of NO by Hydrocarbons and by Ammonia, 1995, 155, 414.

Bogner, W.; Kramer, M.; Krutzsch, B.; Pishchinger, S.; Voigtlander, D.; Wenninger, G.; Wirbeleit, F.; Brogan, M.S.; Brisley, R.J.; Webster, D.E., Applied Catalysis B:; Removal of nitrogen oxides from the exhaust of a lean–tune gasoline engine, 1955, 7, 153.

Arai, H.; Machida, M., Catalysis Today, Removal of $No_x$ through sorption–desorption cycles over oxides and zeolites, 1994, 22, 97.

Eguchi, K.; Watabe, M.; Ogata, S.; Arai, H., Journal of Catalysis, Reversible Sorption of Nitrogen Oxides in Mn–Zr Oxide, 1996, 158, 420.

Li, W.B.; Yang, R.T.; Krist, K.; and Regalbuto, J.R., Energy & Fuels, Selective Adsorption of $No_x$ from Hot Combustion Gases by Ce–Doped $CuO/TiO_2$, 1997, 11, 428.

*Primary Examiner*—Robert H. Spitzer
*Attorney, Agent, or Firm*—Pauley Petersen Kinne & Fejer

[57] ABSTRACT

Selective and thermally reversible adsorption of $NO_x$ from a mixture of hot gases is achieved by contact with an adsorbent of active copper in the form of CuO on a support of $TiO_2$ and $SiO_2$ and in the form of $Cu^{+2}$ on a support of pillared clay.

18 Claims, 7 Drawing Sheets

SELECTIVE NITROGEN OXIDES ADSORPTION FROM HOT GAS MIXTURES AND THERMAL RELEASE BY ADSORBENT

BACKGROUND OF THE INVENTION

1. Field of the Invention

The present invention relates to selective and thermally reversible adsorption of $NO_x$ from a mixture of hot gases by surface actions with copper in the form of CuO on a support material, such as $TiO_2$ and $SiO_2$, and in the form of $Cu^{+2}$ on pillared clays. The selective and thermally reversible $NO_x$ adsorption is particularly useful for treatment of internal combustion engine and power plant effluents.

2 Description of Related Art

Selective catalytic removal of $NO_x$ has been a most effective means for $NO_x$ abatement. $V_2O_5/TiO_2$ has been the principal commercial catalyst used for selective catalytic removal with $NH_3$ from stationary sources. Bosch, H; Janssen, F., Catal. Today, 1988, 2, 369. Noble metals Pt—Rh—Pd catalyst is the catalyst used in automobiles, primarily for removal of CO. Taylor, K. C., Catal. Rev. Sci. Eng., 1993, 35, 457, and Zwinkels, M. M.; Jarus, S. G.; Menon, P. G., Catal. Rev. Sci. Eng., 1993, 35, 319. The noble metal catalyst is effective as a three way catalyst, however, it suffers severe loss of activity for NO reduction in the presence of excess oxygen prevalent in exhaust from diesel and lean-burn engines. Other tri-metal three way catalysts are described in U.S. Pat. Nos. 5,108,716; 5,386,690; 5,593,647 and 5,322,671. Other catalysts which have attracted interest as hydrocarbon selective catalytic removal catalysts are Cu—ZSM-5, Iwamoto, M.; Mizuno, N., Proc. Inst. Mech. Eng., Part D, 1993, 207, 23 and Held, W.; Konig, A.; Richter, T.; Puppe, L., SAE Tech. Pap., 1990, No. 900, 469, and Co—ZSM-5, Li, Y.; Battavio, P. J.; Armor, J. N., J. Catal., 1993, 142, 561. However, these catalysts are deactivated rapidly by moisture and $SO_2$. Li, Y.; Battavio, P. J.; Armor, J. N., J. Catal., supra; Armor, J. N., Appl. Catal. B., 1995, 5, N18 and Li, Y.,; Armor, J. N., Appl. Catal. B, 1995, 5, L257. A most promising selective catalytic reduction catalyst for reduction of NO by hydrocarbons and by ammonia has been $Cu^{2+}$ exchanged $TiO_2$-pillared clays exhibiting high activities and low deactivation by $H_2O$ and $SO_2$. Yang, R. T.; Li, W. B., J. Catal., 1995, 155, 414. Selective catalytic reduction of nitric oxide by ethylene over $Cu^{2+}$ ion-exchanged pillared clays is taught by Li, W. B.; Sirilumpen, M.; Yang, R. T., Appl. Catal., 1997, 11, 347.

Ceria is known to be an effective promoter for the NO selective catalytic removal reaction with $NH_3$, Chen, J. P.; Hausladen, M. C.; Yang, R. T., J. Catal., 1995, 151, 135, and with hydrocarbon, Yang, R. T.; Li, W. B., J. Catal., 1995, 155, 414. Ceria alone, however, does not chemisorb NO at elevated temperatures. Niwa, M.; Furukawa, Y.; Murakami, Y., J. Colloid. Interface Sci., 1982, 86, 260.

Staged, or series arranged, catalytic converters for purifying exhaust gases from internal combustion engines are described in U.S. Pat. Nos. 5,512,251; 5,399,324 and 5,556,604.

U.S. Pat. No. 5,388,406 teaches purification of exhaust of an internal combustion engine using as an absorbent a composite oxide of copper and an alkali metal, alkali earth, and/or rare earth, which may be cerium coated, for absorption and thermal release of $NO_x$ followed by catalytic $NO_x$ decomposition. This patent teaches that NO cannot be absorbed by the $NO_x$ absorption/release material. This patent is based upon absorption of $NO_x$ to form $Ba(NO_3)_2$, or alkali nitrate, where CuO functioned as a catalyst. The process of this patent does not use the adsorption ability of CuO. Another method, applicable to lean-burn engines, is to dope noble metals on the sorbent and to operate the engine with pulses of rich-burn conditions, during which time adsorbed $NO_x$ decomposes to $N_2$. Brogan, M. S.; Brisley, R. J.; Walker, A. P.; Webster, D. E.; Bogner, W.; Fekete, N. P.; Kramer, M.; Krutzsch, B.; Voigtlander, D., SAE Tech. Pap., 1995, No. 952, 490 and Bogner, W.; Kramer, M.; Krutzsch, B.; Pischinger, S.; Voigtlander, D.; Wenninger, G.; Wirbeleit, F.; Brogan, M. S.; Brisley, R. J.; Webster, D. E., Appl. Catal. B, 1995, 7, 153.

A promising alternative for hydrocarbon selective catalytic removal is $NO_x$ trapping, or adsorption/absorption of $NO_x$ at high temperatures with a very $NO_x$ specific sorbent. Such a sorbent must be able to selectively adsorb $NO_x$ from oxygen-rich combustion gases which also contain $H_2O$, $SO_2$, $CO_2$ and $N_2$ at temperatures of about 150° to about 350° C., depending upon the specific application. The sorption rates must be high, for example, suitable for applications at space velocities of greater than about 3000 l/h. The sorption must be reversible either by increasing temperature or decreasing pressure, so that a desorption stream concentrated in $NO_x$ can be obtained. Yang, R. T., Gas Separation by Adsorption Processes, Butterworth, Boston, 1987, Chapter 5. The concentrated stream can be recycled to a combustion zone for decomposition of NO to $N_2$. Desorption/decomposition can also be achieved by injection of a reducing gas. The searches for an advantageous sorbent for $NO_x$ have been reviewed by Kaneko, K.; Inouye, K., Adsorpt. Sci. Technol., 1988, 5, 239 and Arai, H.; Machida, M., Catal. Today, 1994, 22, 97. Transition metal oxides sorbents have been described by Otto, R.; Shelef, M., J. Catal., 1970, 18, 184, Yao, H. C.; Shelef, M., In The Catalytic Chemistry of Nitrogen Oxides, Klimisch, R. L.; Larson, J. G.; Eds., Plenum, New York, 1978, 45, Segawa, K.; Chen, Y.; Kubsh, J. E.; Delgass, W. N.; Dumesic, J. A.; Hall, W. K., J. Catal., 1982, 76, 112, Yuen, S.; Chen, Y.; Kubsh, J. E.; Dumesic, J. A.; Topsoe, N.; Topsoe, H., J. Phys. Chem., 1982, 86, 3022, Lund, C. R. F.; Schorfheide, J. J.; Dumesic, J. A., J. Catal., 1979, 57, 105. Sorbents of ZSM-5 or MFI zeolites exchanged by $Cu^{2+}$ and other cations have been described by Zhang, W.; Yahiro, H.; Mizuno, N.; Izumi, J.; Iwamoto, M., Langmuir, 1993, 9, 2337. Sorbents of $Fe_2O_3$ dispersed on activated carbon fibers have been described by Kaneko, K., Langmuir, 1987, 3, 357 and Kaneko, K., Colloid Surf., 1989, 37, 879. Zeolites as sorbents have been described by Joithe, W.; Bell, A. T.; Lynn, S., Ind. Eng. Chem. Process Res. Dev., 1972, 11, 434 and Zhang, W. X.; Yahiro, H.; Mizuno, N.; Izumi, J.; Iwamoto, M., J. Mater. Sci. Lett., 1993, 12, 1197. Y—Ba—Cu—O as sorbents have been described by Tabata, K.; Fukuda, H.; Kohiki, S,; Misono, M., M. Chem. Lett. 1988, 799 and Mizuno, N.; Yamato, M.; Misono, M., J. Chem. Soc., Chem. Commmun., 1988, 887. Carbon as an adsorbent has been described by Rubel, A. M.; Stencil, J. M., Energy Fuels, 1996, 10, 794. Mixed metal oxides as sorbents have been described by Brogan, M. S.; Brisley, R. J.; Walker, A. P.; Webster, D. E.; Bogner, W.; Fekete, N. P.; Kramer, M.; Krutzsch, B.; Voigtlander, D., supra, Bogner, W.; Kramer, M.; Krutzsch, B.; Pischinger, S.; Voigtlander, D.; Wenninger, G.; Wirbeleit, F.; Brogan, M. S.; Brisley, R. J.; Webster, D. E., supra, and Machida, M.; Yasuoko, K.; Eguchi, K.; Arai, H. J., J. Chem. Soc., Chem. Commun., 1990, 1165. Mixed metal oxides of Mn—Zr (1:1 molar ratio) having most promising $NO_x$ capacity and rate of uptake of prior sorbents have been reported by Eguchi, K.; Watabe, M.; Ogata, S.; Arai, H., J. Catal., 1996, 158, 420.

CuO supported on γ-Al$_2$O$_3$ has been studied for NO$_x$ adsorption at room temperature by Yao, H. C. and Shelef, M., supra. However, sulfation of γ-Al$_2$O$_3$ takes place at elevated temperatures resulting in pore closure due to increase in the crystalline volume. Num, I. S.; Eldridge, J. W.; Kittrell, J. R., J. R. Ind. Chem. Prod. Res. Dev., 1986, 25, 192, Nam, S. W.; Gavalas, G. R., Appl. Catal., 1989, 55, 193 and Yoo, K. S.; Kim, S. D.; Park, S. B., Ind. Eng. Chem. Res., 1994, 33, 1786. It has been reported that NO at 1000 ppm does not chemisorb on V$_2$O$_5$ on a TiO$_2$ support at temperatures above 300° C., but does chemisorb at temperatures as high as 400° C. on sulfated TiO$_2$ surface, formed by exposure of TiO$_2$ to SO$_2$ and O$_2$ at low concentrations. Chen, J. P.; Yang, R. T., J. Catal., 1993, 139, 277.

Portions of the present invention are described in Li, W. B.; Yang, R. T.; Krist, K.; and Regalbuto, J. R., Energy & Fuels, 1997, 11, 428, which is incorporated herein in its entirety by reference.

SUMMARY OF THE INVENTION

It is an object of this invention to provide an adsorbent and a process for selective adsorption of NO$_x$ from hot gas mixtures and thermal release by the adsorbent.

It is another object of this invention to provide an adsorbent and process for thermally reversible selective adsorption of NO$_x$ from hot gas mixtures which provides higher uptake rates and increased NO$_x$ capacity, as compared with prior known adsorbents and processes.

Still another object of this invention is to provide an adsorbent and process for thermally reversible selective adsorption of NO$_x$ from hot gas mixtures also containing at least one of H$_2$O, CO$_x$ and SO$_x$.

These and other objects and advantages of this invention are achieved by contact of an NO$_x$ containing hot gas mixture with an adsorbent of active copper in the form of CuO on a support material, such as, for example TiO$_2$ and SiO$_2$, and in the form of Cu$^{+2}$ on pillared clays. Mixtures of these forms of copper and support materials may be used.

BRIEF DESCRIPTION OF THE DRAWINGS

The invention will be described with respect to specific embodiments with reference to the figures, wherein.

DESCRIPTION OF PREFERRED EMBODIMENTS

Figure 1:
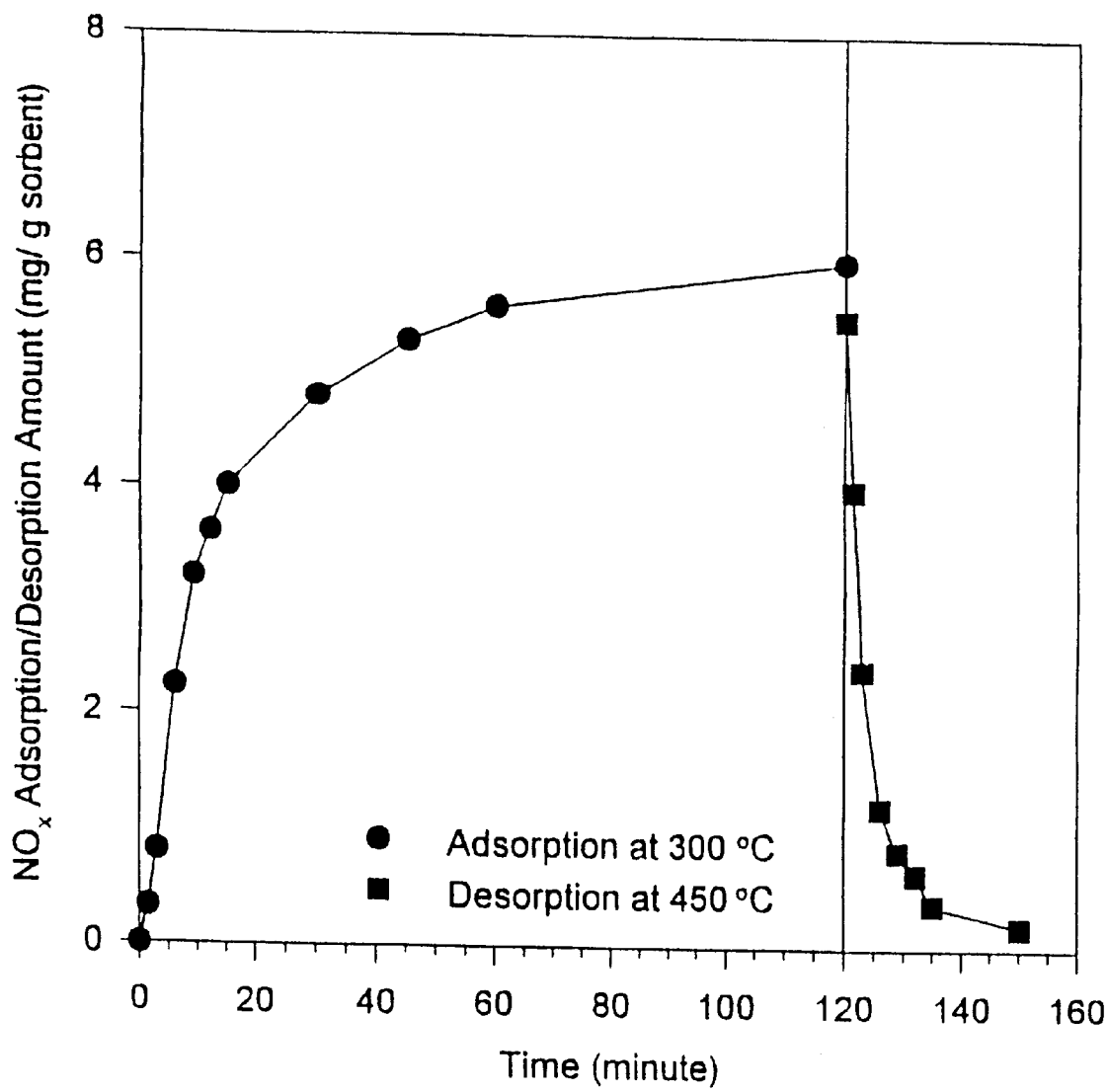
FIG. 1 shows adsorption at 300° C. and desorption at 450° C. of NO$_x$ using 5% CuO/TiO$_2$.

In the practice of this invention, nitrogen oxides containing hot gases, such as internal combustion engine or power plant effluents, are passed in contact with an active adsorbent of copper in the form of CuO on a support material selected from TiO$_2$ and SiO$_2$ and in the form of Cu$^{+2}$ on pillared clays. The CuO containing adsorbents may be formulated as more fully described in the specific Examples below and in Li, W. B.; Yang, R. T.; Krist, K.; and Regalbuto, J. R., Energy & Fuels, 1997, 11, 428, incorporated herein in its entirety by reference. The Cu$^{+2}$ on pillared clay adsorbents may be prepared as more fully described in Li, W. B.; Sirilumpin, M.; and Yang, R. T., Appl. Catal., 1997, 11, 347, incorporated herein in its entirety by reference. Suitable loading of the copper on a support material is about 1 to about 20 weight percent copper, based upon the weight of the support material. Preferred ranges of loading of copper on the support material is about 5 to about 10 weight percent copper, based upon the weight of the support material. Suitable surface areas of the adsorbent are about 10 to about 1500 meters$^2$/gram. However, in addition to desirably high surface areas, the support material must have sufficiently large pore sizes to provide high adsorption rates. We have found that while sol-gel TiO$_2$ had a surface area of about 120 m$^2$/gm, the pore sizes were not large enough to provide desired high adsorption rates. We have found that CuO/TiO$_2$ with surface areas of about 20 to about 100 m$^2$/gm and Cu$^{+2}$ on pillared clays with surface areas of about 100 to about 400 m$^2$/gm have exhibited good NO$_x$ adsorption under conditions of this invention. It is apparent that the adsorption and thermal desorption of the process of this invention is a surface reaction, and one skilled in the art will recognize suitable relationships of surface areas and pore sizes to obtain benefit of the invention. We have found especially suitable adsorbents for use in this invention to be CuO/TiO$_2$ with surface areas about 20 to about 100 m$^2$/gm and Cu$^{+2}$ on delaminated Al$_2$O$_3$-pillared lamponite clay with surface areas about 100 to about 400 m$^2$/gm.

The selective adsorption of NO$_x$ may be enhanced, exhibiting both higher NO$_x$ uptake rates and greater NO$_x$ capacity, by doping the active copper adsorbent with a dopant selected from CeO$_x$ and LaO$_x$. Suitable amounts of dopant are about 0.1 to about 5 weight percent dopant, based upon the weight of the active copper/support, about 1 to about 4 weight percent dopant being preferred. CeO$_x$ alone does not chemisorb NO$_x$ at elevated temperatures, and therefore, CeO$_x$ acts as a promoter and its redox property facilitates the chemisorption of NO$_x$.

The process of thermally reversible selective NO$_x$ adsorption by active copper according to this invention is carried out by contacting the above described adsorbent with a hot gas mixture containing NO$_x$ at a temperature of about 100° to about 350° C. for the CuO/support adsorbent and up to about 500° C. for the Cu$^{+2}$/pillared clay adsorbent. NO$_x$ adsorption according to the process of this invention tends to level off after a period of time dependent upon the nature of the adsorbent and the quantity of NO$_x$ contacted by the adsorbent. The adsorbent may then be reactivated by rapid and nearly complete desorption of NO$_x$ by rapidly heating the adsorbent to desorption temperatures of at least about 50° C., and preferably about 100° C. and higher than the adsorption temperature. Especially suitable desorption temperatures are about 400° to about 600° C. This cycle may be repeated using the same adsorbent. For continuous adsorption/desorption, a plurality of adsorbers/desorbers may be used in a process stream in alternate cyclic operation. It is seen in the Figures that over 95% of the NO$_x$ adsorbed was rapidly desorbed. The high amount and rapid desorption, obtained with the process of this invention, provides good working capacities of the adsorbent.

The $NO_x$ adsorption/desorption process of this invention can be used for $NO_x$ trapping or storage from any elevated temperature process stream, such as, for example in chemical processing, combustion effluents from power plants and internal combustion engines. The adsorbent and process of this invention may be combined with $NO_x$ decomposition catalysts and catalytic processes to achieve enhanced $NO_x$ removal and decomposition of $NO_x$ in elevated temperature mixed gas streams.

An advantage of this invention is the rapidity and extent of both adsorption and desorption of $NO_x$ by the adsorbent at elevated temperatures commonly experienced in process streams, particularly combustion effluent streams.

Another advantage of the $NO_x$ adsorbents and process of this invention is the favorable affect of the presence of $CO_2$ in the hot gas mixture containing $NO_x$ for adsorption. While there is a small decrease in initial $NO_x$ sorption rate, the $NO_x$ sorption capacity is substantially increased with no effect upon $NO_x$ desorption by the presence of $CO_2$. These effects of $CO_2$ are more completely shown in Example 4 and FIG. 4. $CO_2$ presence has been a major problem when using metal oxide sorbents due to formation of carbides.

It is another advantage of this invention that the presence of water in the hot gas mixture causes a small reduction in $NO_x$ adsorption capacity, does not alter the high rate of $NO_x$ adsorption, and is completely reversible at temperatures for $NO_x$ desorption. These effects of water are more completely shown in Example 5 and FIGS. 5 and 6.

Still another advantage of this invention is that the presence of $SO_2$ in the hot gas mixture, while reducing $NO_x$ capacity, does allow cyclic adsorption and desorption of $NO_x$ with successively similar adsorption and desorption curves for $NO_x$. These effects are more completely described in Example 6 and FIG. 7.

The $NO_x$ adsorbents and process of this invention for thermally reversible adsorption of $NO_x$ from hot gas mixtures, in the case of 2% Ce—5% $CuO/TiO_2$, provides higher uptake rates, by 100% in initial rate, and higher $NO_x$ capacity, by 15%, when compared to the most promising prior $NO_x$ adsorbent $MnO/ZrO_2$ described by Eguchi, et al, 1996, Supra. These comparisons are more completely shown in Example 3 and FIG. 3.

The following examples are set forth using specific materials and conditions to specifically exemplify this invention and should not be taken to limit the invention in any way.

EXAMPLE 1

For adsorption/desorption measurements, a titania support was used for the adsorbent. Pellets of $TiO_2$ were prepared by a densification procedure. One gram of $TiO_2$ powder (Degussa) was thoroughly mixed with 1.75 mL distilled water, the resulting paste air-dried in an oven at 60° C. for 24 hours and at 120° C. for 72 hours following which it was crushed and sieved to collect the 80–100 mesh fraction. The 80–100 mesh fraction was then calcined at 450° C. in air for 12 hours. The BET area of the $TiO_2$ support was 50 $m^2/g$.

An adsorbent of 5% CuO on $TiO_2$ support was prepared using incipient wetness impregnation with aqueous solution of $Cu(NO_3)_2 \cdot 2.5H_2O$ prepared from $Cu(NO_3)_2$ from Aldrich. The amount of CuO was maintained at 5%, by weight, of $TiO_2$. The impregnated sorbent was dried at 110° C. for 5 hours followed by calcination at 450° C. for 10 hours.

Adsorption/desorption of $NO_x$ was measured using a thermogravimetric analyzer microbalance, TGA Cahn 2000 system 113, equipped with a programmed temperature control unit. A 20 mg 5% $CuO/TiO_2$ supported adsorbent was suspended in a quartz bucket which was suspended in the heated zone of a quartz tube. A thermocouple was placed as close to the bucket as possible to indicate the temperature of the sorbent.

Helium, 99.9% purity, was passed over the supported adsorbent at 450° C. and the supported adsorbent cooled to a specified adsorbent temperature prior to initiation of a mixed gas stream for adsorption measurements. Calibrations for all step changes in gas composition or temperature were made to accurately account for differences in buoyancy and friction losses. A gas mixture containing 2000 ppm NO, 4% $O_2$ and the balance He was prepared by blending gas streams of controlled flow rates and the mixed stream passed in contact with the supported adsorbent at a temperature of 300° C. and a flow rate of 50 mL/min for adsorption measurements. Helium, 99.9% purity from Metro Welding, was used as a carrier. The mixed gas flow was continued for 120 minutes and the $NO_x$ adsorption, mg/g adsorbent, is shown in FIG. 1. Using the uptake rates and adsorption amounts, in terms of isotherm, the breakthrough curves for fixed bed adsorbers can be calculated as described in Yang, R. T., Gas Separation for Adsorption Processes, Butterworth, Boston, 1987, Chapter 5. The amount adsorbed and the uptake rate shown in FIG. 1 were both very high for adsorber operation resulting in a high purity effluent.

After 120 minutes, the adsorbent was heated to 450° C. in 2 minutes in the same gas flow. The results of desorption of $NO_x$ over a period of 30 minutes at 450° C. are shown in FIG. 1. These results show the rapid amount of desorption at 450° C. and that well over 95% of the amount adsorbed was rapidly desorbed. The working capacity of the adsorbent, that is the reversible amount, depends upon the time of desorption.

EXAMPLE 2

A 2% Ce—5% $Cu/TiO_2$ adsorbent was prepared by the incipient wetness procedure, as described above, with aqueous cerium nitrate solution on 5% $Cu/TiO_2$ as prepared in Example 1. The amount of Ce was maintained at 2%, by weight percent of Ce, based upon the $CuO/TiO_2$. The Ce—$CuO/TiO_2$ was dried at 110° C. for 5 hours and then calcined at 450° C. for 10 hours.

Figure 2:
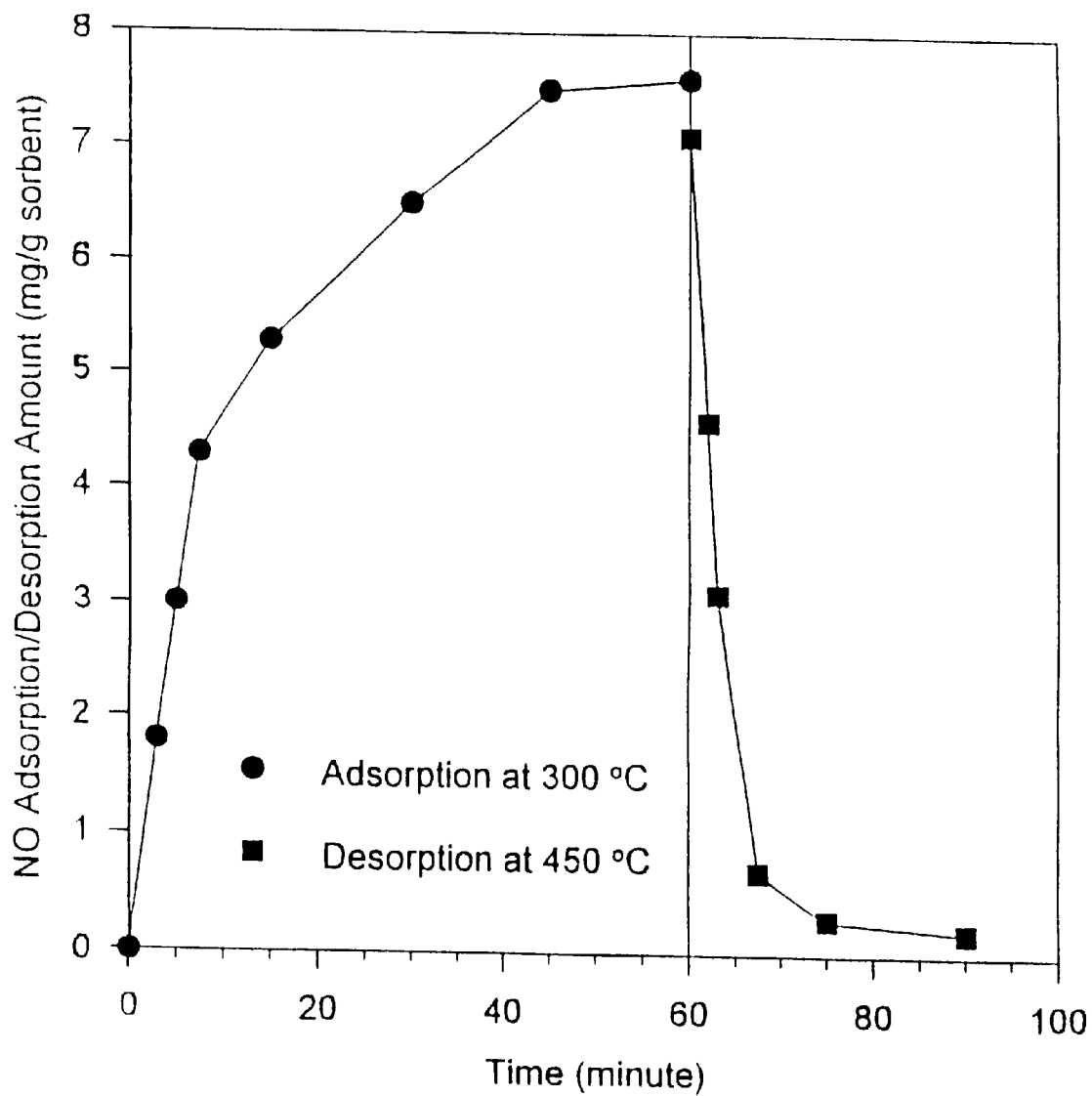
FIG. 2 shows adsorption at 300° C. and desorption at 450° C. of NO$_x$ using 2% Ce—5% CuO/TiO$_2$.

Adsorption/desorption of $NO_x$ on the Ce—$Cu/TiO_2$ adsorbent was conducted under the same conditions as set forth in Example 1 and the results are shown in FIG. 2. Comparison of FIGS. 1 and 2 show that the $CeO_2$ dopant substantially increased both the $NO_x$ capacity and uptake rate. Under the conditions set forth, the sorbent capacity was increased from approximately 6 to 7.7 mg/g, or approximately 30%, and the initial sorption rate increased from 3.4 to 5.0 mg/g, at 10 minutes, or a 50% increase. The chemisorption rate was clearly the controlling step in the uptake, and the $CeO_2$ dopant substantially increased the chemisorption rate.

EXAMPLE 3

Adsorbent 2% Ce—5% $CuO/TiO_2$ as prepared in Example 2 was subjected to adsorption at 200° C. in a gas flow of 1000 ppm NO and 4% $O_2$ for 120 minutes and desorption at 450° C. in the same gas flow for 20 minutes. The results are shown in FIG. 3.

Figure 3:
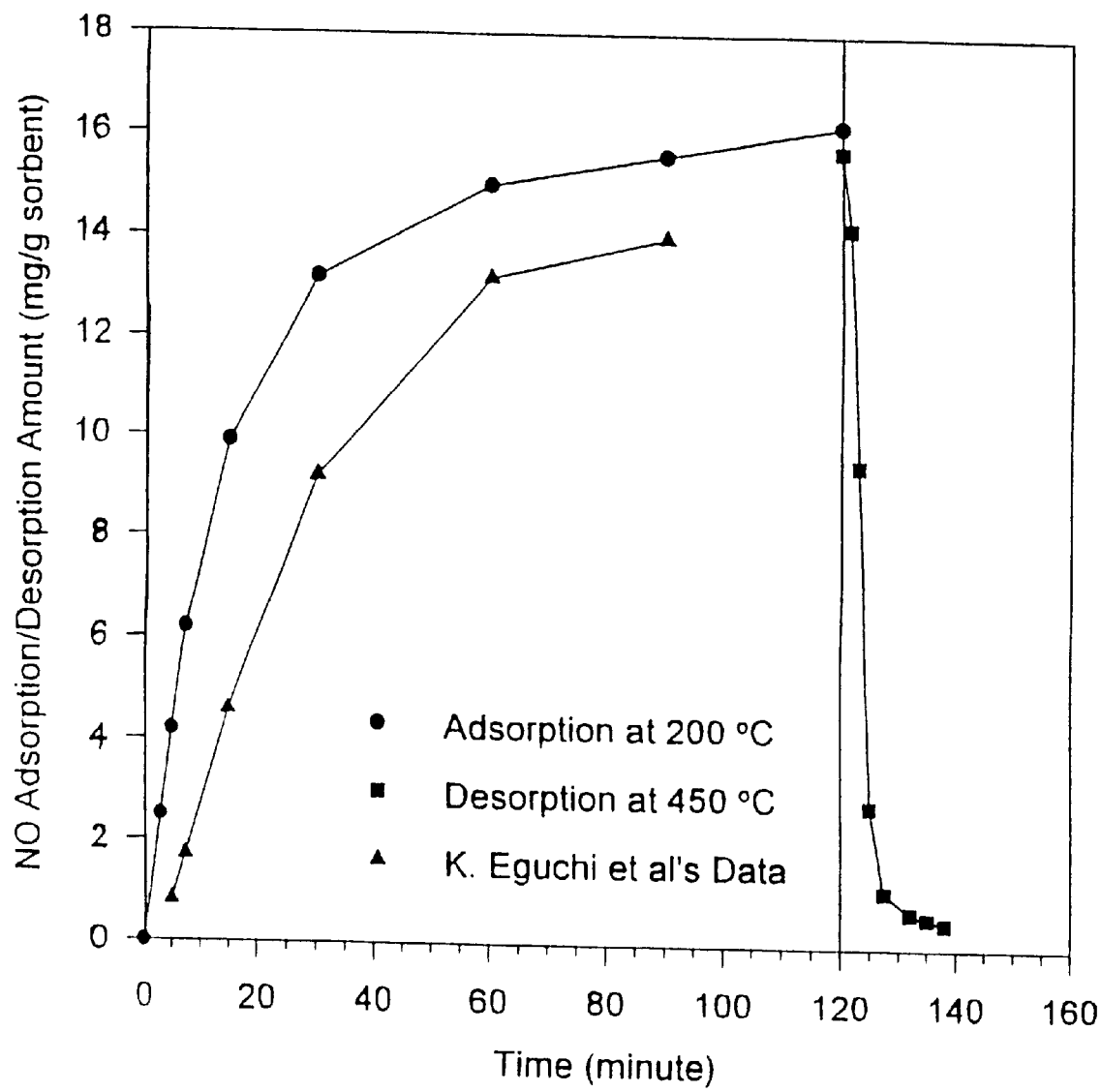
FIG. 3 shows adsorption at 200° C. and desorption at 450° C. of NO$_x$ using 2% Ce—5% CuO/TiO$_2$ compared with MnO/ZrO$_2$.

Also plotted in FIG. 3 are the results of Eguchi, et al., supra, using the sorbent $MnO/ZrO_2$, 1:1 molar ratio, under the same conditions as the Ce—$CuO/TiO_2$ adsorbent, except that Eguchi, et al used 10% $O_2$ concentration which would increase the $NO_x$ adsorption rate and capacity according to Eguchi, et al.

Comparison of the results of $NO_x$ adsorption according to this invention and those of Eguchi, et al., the most promising $NO_x$ adsorbent reported in the literature, shows that the Ce—CuO/$TiO_2$ sorbent, according to this invention, in the presence of 4% $O_2$ as compared with Eguchi, et al's 10% $O_2$, provides an initial uptake rate of more than double and a final capacity higher by about 15%.

EXAMPLE 4

Figure 4:
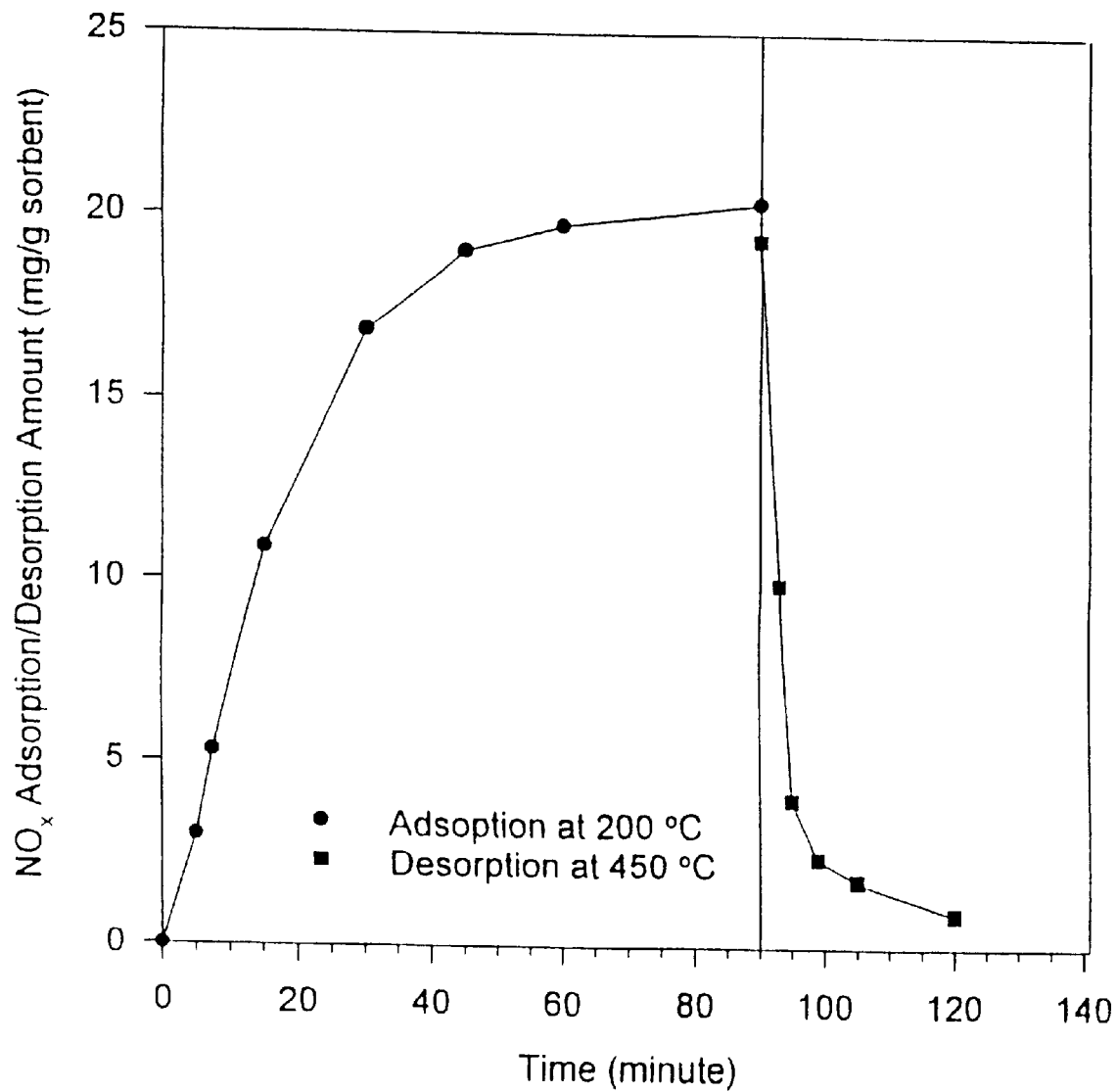
FIG. 4 shows adsorption at 200° C. and desorption at 450° C. of NO$_x$ in the presence of 13% CO$_2$ using 2%C e—5% CuO/TiO$_2$.

The effect of $CO_2$ has been a major concern for metal oxide sorbents due to formation of carbonates. The effects of $CO_2$ on $NO_x$ adsorption were investigated for the Ce—CuO/$TiO_2$ sorbent, as prepared in Example 2, at 200° C., since any effects of $CO_2$ would become less at higher temperatures. The sorbent was first exposed to a gas flow containing 13% $CO_2$ and 4% $O_2$ in He and no uptake or weight change by the adsorbent was detected. A gas flow of 1000 ppm NO, 4% $O_2$ and 13% $CO_2$ in helium was passed as described in Example 1 for adsorption at 200° C. and desorption at 450° C. The results are shown in FIG. 4. The $NO_x$ adsorption was altered by the $CO_2$ by a small decrease in initial sorption rate and by an increase in $NO_x$ capacity by over 25%, as seen by comparison of FIGS. 4 and 3. Since the adsorption rates were measured only by weight gain, the surface species were not known. No changes in desorption were observed due to the $CO_2$ presence.

EXAMPLE 5

The effects of $H_2O$ on $NO_x$ adsorption were investigated for the Ce—CuO/$TiO_2$ sorbent, as prepared in Example 2, at 200° C.

Water vapor was introduced by saturating He carrier gas through a gas wash bottle. Adsorption of $H_2O$ was obtained by a flow of 2.7% $H_2O$ in He for 90 minutes at 200° C. The results are shown in FIG. 5.

Following the adsorption of $H_2O$ for 90 minutes, a flow of 2.7% $H_2O$, 1000 ppm NO and 4% $O_2$ in He was conducted for an additional 90 minutes at 200° C. The results are shown in FIG. 5 which shows, by comparison with FIG. 3, a reduction in $NO_x$ capacity, however, the rapid uptake of $NO_x$ on the $H_2O$ presaturated sorbent was similar to that without $H_2O$ presorption. The amount of $NO_x$ adsorbed on the $H_2O$ presorbed adsorbent was about 72% of that without $H_2O$ presorption, indicating that $H_2O$ and $NO_x$ adsorption take place on different sites resulting in the presence of $H_2O$ causing only a small reduction in $NO_x$ adsorption.

Figure 5:
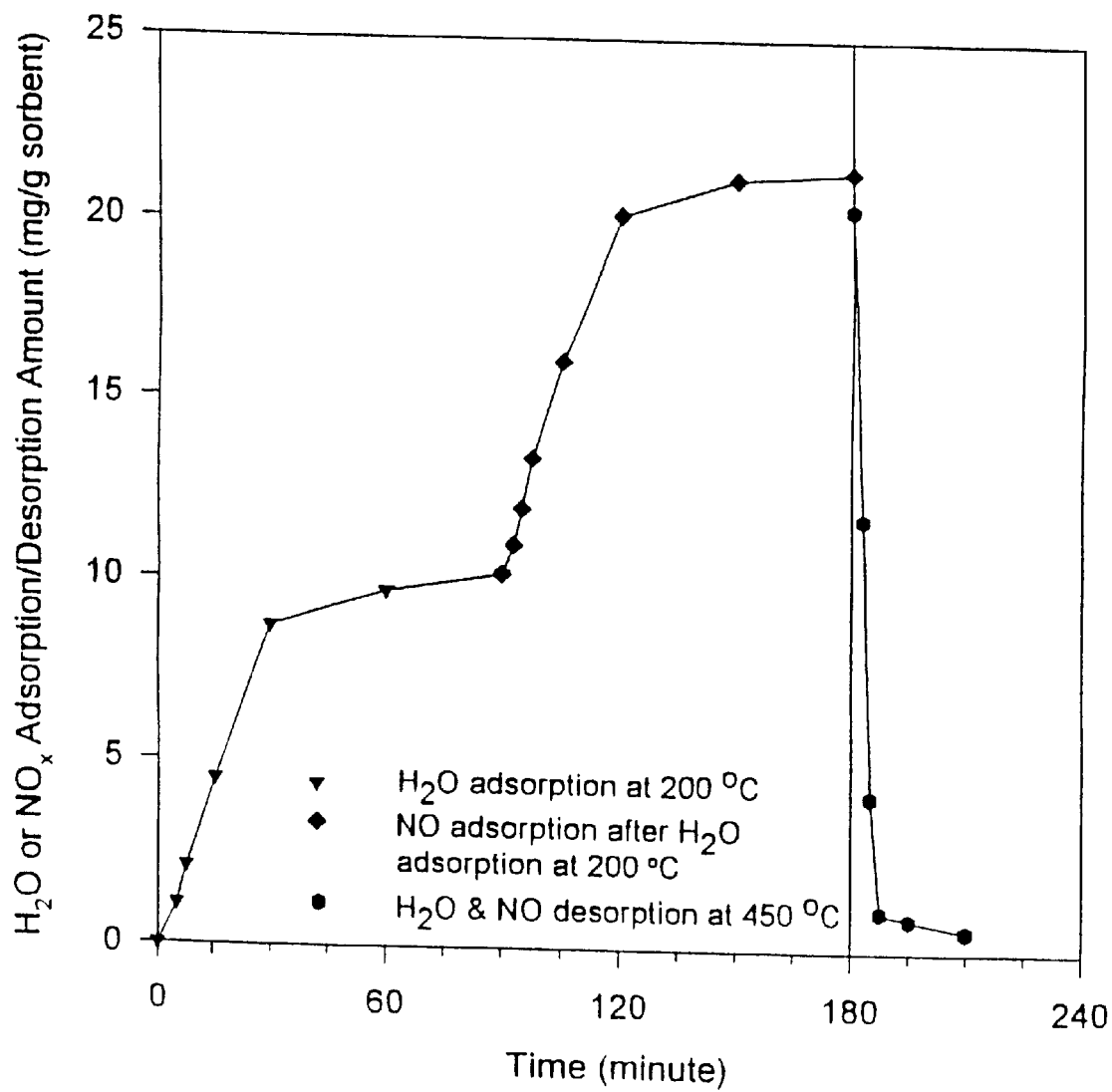
FIG. 5 shows adsorption at 200° C. first of 2.7% H$_2$O followed by NO$_x$ in the presence of 2.7% H$_2$O and desorption at 450° C. using 2% Ce—5% CuO/TiO$_2$.

The sorbent was rapidly heated to 450° C. in the same gas flow and both $H_2O$ and $NO_x$ were desorbed rapidly, as shown in FIG. 5.

Figure 6:
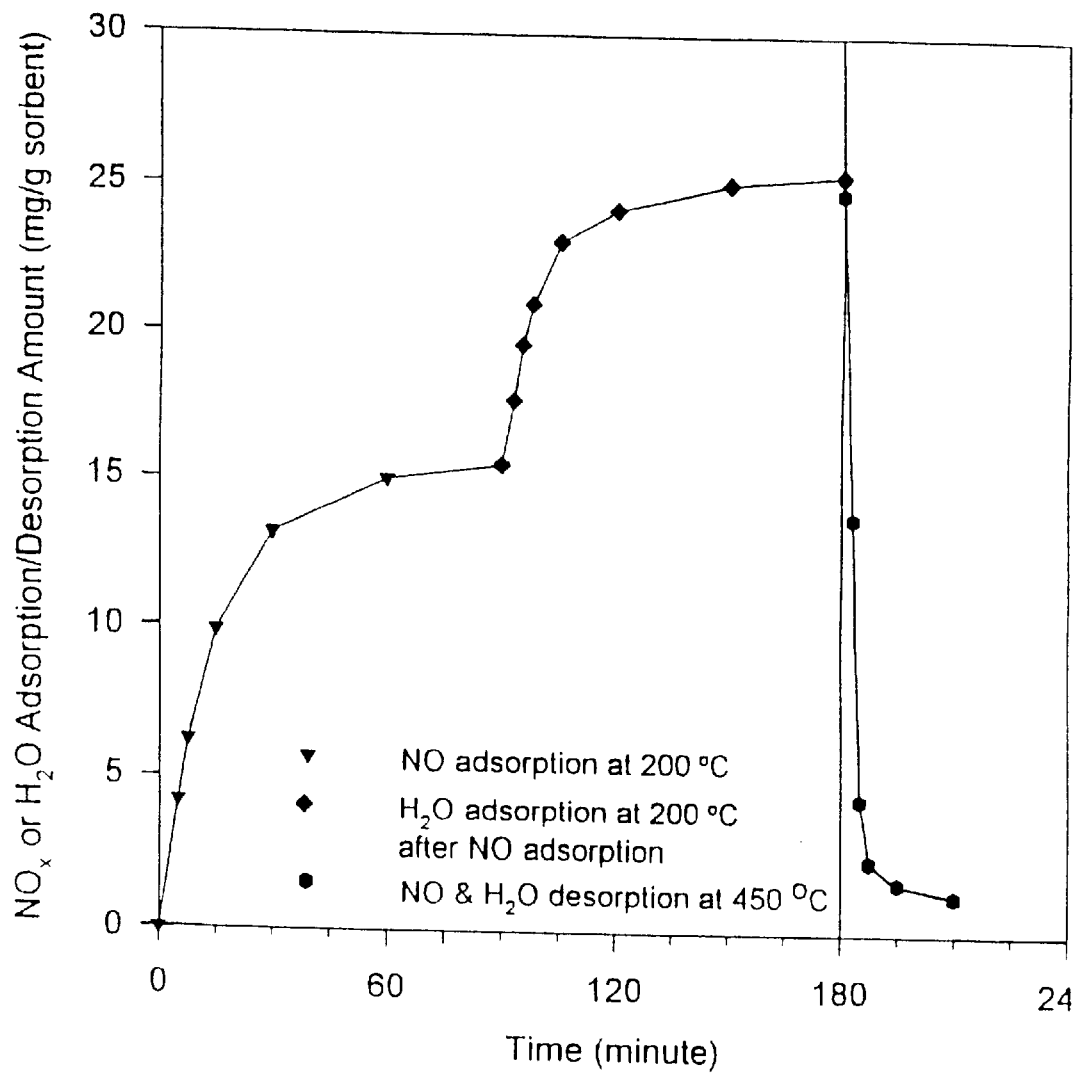
FIG. 6 shows adsorption at 200° C. first of NO$_x$ followed by NO$_x$ in the presence of 2.7% H$_2$O and desorption at 450° C. using 2% Ce—5% CuO/TiO$_2$.

The effect of $H_2O$ was also investigated by reversing the sequence of adsorption. The Ce—CuO/$TiO_2$ sorbent was first exposed to 1000 ppm NO and 4% $O_2$ in He at 200° C. for 90 minutes followed by addition of 2.7% $H_2O$ to the gas mixture for another 90 minutes. Desorption in the same gas flow was conducted at 450° C. The results are shown in FIG. 6. Again $NO_x$ and $H_2O$ were adsorbed nearly independently and the coadsorbed $NO_x$ and $H_2O$ were reversibly adsorbed.

EXAMPLE 6

Figure 7:
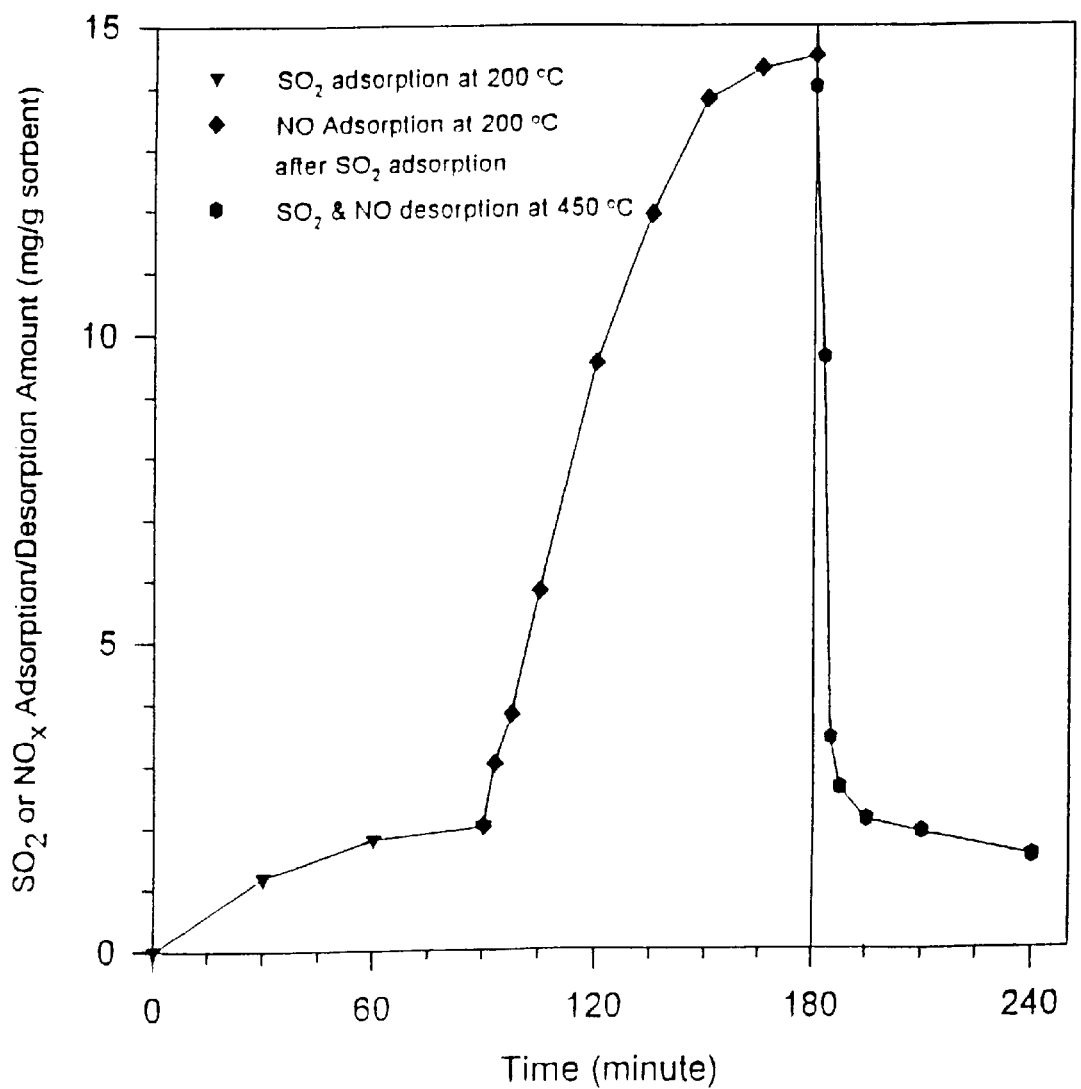
FIG. 7 shows adsorption at 200° C. first of SO$_2$ followed by NO$_x$ in the presence of SO$_2$ and desorption at 450° C. using 2% Ce—5% CUO/TiO$_2$.

The effect of $SO_2$ on $NO_x$ adsorption on Ce—CuO/$TiO_2$ adsorbent were studied at 200° C. A gas mixture of 1500 ppm $SO_2$ and 4% $O_2$ in He was passed over the sorbent for 90 minutes following which a gas mixture of 1000 ppm of NO, 1500 ppm $SO_2$ and 4% $O_2$ in He was passed over the sorbent for an additional 90 minutes. The results are shown in FIG. 7. A rapid uptake of NO was observed, however the NO adsorption capacity was reduced about 20% by the $SO_2$, by comparison of FIG. 7 with FIG. 6.

Desorption was achieved by rapid heating to 450° C. and maintaining the NO/$SO_2$/$O_2$/He gas flow for an additional 60 minutes. The results are shown in FIG. 7 showing that adsorption of $NO_x$ is reversible at 450° C. whereas that of $SO_2$ is irreversible at that temperature.

Cyclic $NO_x$ adsorption/desorption was performed in the presence of $SO_2$. In this run, the sorbent was cooled to 200° C. in $SO_2$/$O_2$/He gas flow after desorption at 450° C. NO was reintroduced to the gas mixture and a temperature of 200° C. was maintained and desorption was conducted at 450° C. The same uptake and desorption curve as shown in FIG. 7 was obtained, strongly suggesting that the sorbate retained after desorption at 450° C. was $SO_x$. This is consistent with sulfating of the $Tio_2$ surface by $SO_2$+$O_2$ at the above temperature range and that the sulfate cannot be desorbed at 450° C. Yoo, K. S.; Kim, S. D.; Park, S. B., Ind. Eng. Chem. Res., 1994, 33, 1786.

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

We claim:

1. A process for $NO_x$ selective thermally reversible adsorption from a hot gas mixture containing $NO_x$ comprising; contacting said hot gas mixture with an adsorbent comprising active copper in the form of CuO on a support material selected from the group consisting of $TiO_2$ and $SiO_2$, said contacting being performed at an adsorption temperature of about 100° to about 350° C. to selectively adsorb a substantial portion of $NO_x$ from said gas mixture followed by heating said adsorbent to a desorption temperature of at least 50° higher than said adsorption temperature to desorb said $NO_x$ from said adsorbent.

2. A process for $NO_x$ selective thermally reversible adsorption according to claim 1 wherein said desorption temperature is at least 100° C. higher than said adsorption temperature.

3. A process for $NO_x$ selective thermally reversible adsorption according to claim 1 wherein said desorption temperature is about 400° to about 600° C.

4. A process for $NO_x$ selective thermally reversible adsorption according to claim 1 wherein said desorption is continued until at least 95 percent of the $NO_x$ adsorbed is desorbed.

5. A process for $NO_x$ selective thermally reversible adsorption according to claim 1 wherein loading of said active copper on said support material is about 1 to about 20 weight percent copper, based upon the weight of the support material.

6. A process for $NO_x$ selective thermally reversible adsorption according to claim 1 wherein said adsorbent has a surface area of about 10 to about 1500 meters$^2$ per gram of adsorbent.

7. A process for $NO_x$ selective thermally reversible adsorption according to claim 1 wherein said active copper is CuO on a support material selected from the group consisting of $TiO_2$ and $SiO_2$, said adsorbent having a surface area of about 20 to about 100 meters$^2$ per gram of adsorbent.

8. A process for $NO_x$ selective thermally reversible adsorption according to claim 1 wherein said active copper on said support material is doped with a dopant selected from the group consisting of $CeO_x$ and $LaO_x$ in an amount of about 0.1 to about 5 weight percent, based upon the weight of said active copper and said support material.

9. A process for $NO_x$ selective thermally reversible adsorption according to claim 1 wherein said adsorbent is $CuO/TiO_2$, loading of said active copper on said support material is about 1 to about 20 weight percent copper based upon the weight of said $TiO_2$, and the surface area of said $Cuo/TiO_2$ is about 20 to about 100 meters$^2$ per gram of $CuO/TiO_2$.

10. A $NO_x$ selective thermally reversible adsorbent comprising active copper in the form of CuO on a support material selected from the group consisting of $TiO_2$ and $SiO_2$ for $NO_x$ selective adsorption from a hot gas mixture containing $NO_x$ and thermal release of $NO_x$ by the adsorbent.

11. A $NO_x$ selective thermally reversible adsorbent according to claim 10 wherein loading of said active copper on said support material is about 1 to about 20 weight percent copper, based upon the weight of the support material.

12. A $NO_x$ selective thermally reversible adsorbent according to claim 10 wherein loading of said active copper on said support material is about 5 to about 10 weight percent copper, based upon the weight of the support material.

13. A $NO_x$ selective thermally reversible adsorbent according to claim 10 having a surface area of about 10 to about 1500 meters$^2$ per gram of adsorbent.

14. A $NO_x$ selective thermally reversible adsorbent according to claim 10 wherein said active copper is CuO on a support material selected from the group consisting of $TiO_2$ and $SiO_2$, said adsorbent having a surface area of about 20 to about 100 meters$^2$ per gram of adsorbent.

15. A $NO_x$ selective thermally reversible adsorbent according to claim 10 wherein said active copper on said support material is doped with a dopant selected from the group consisting of $CeO_x$ and $LaO_x$ in an amount of about 0.1 to about 5 weight percent, based upon the weight of said active copper and said support material.

16. A $NO_x$ selective thermally reversible adsorbent according to claim 15 wherein the amount of said dopant is about 1 to about 4 weight percent, based upon the weight of said active copper and said support material.

17. A $NO_x$ selective thermally reversible adsorbent according to claim 10 wherein said adsorbent is $CuO/TiO_2$, loading of said active copper on said support material is about 1 to about 20 weight percent copper based upon the weight of said $TiO_2$, and the surface area of said $CuO/TiO_2$ is about 20 to about 100 meters$^2$ per gram of $CuO/TiO_2$.

18. A $NO_x$ selective thermally reversible adsorbent according to claim 17 wherein said $CuO/TiO_2$ is doped with a dopant selected from the group consisting of $CeO_x$ and $LaO_x$ in an amount of about 0.1 to about 5 weight percent, based upon the weight of said $CuO/TiO_2$.

* * * * *

UNITED STATES PATENT AND TRADEMARK OFFICE
CERTIFICATE OF CORRECTION

PATENT NO. : 6,033,461
DATED : March 7, 2000
INVENTOR(S) : Ralph T. Yang and Kevin Krist It is certified that error appears in the above-identified patent and that said Letters Patent is hereby corrected as shown below:

Title page,
After "[73] Assignee: Gas Research Institute, Chicago, Ill." insert the following:
-- The Regents of University of Michigan, Ann Arbor, Michigan. --

Signed and Sealed this
Thirty-first Day of July, 2001

*Attest:*

NICHOLAS P. GODICI
*Attesting Officer*    *Acting Director of the United States Patent and Trademark Office*